Jan. 31, 1956
S. WEISS ET AL
2,732,766
MOUNT FOR MORTAR
Filed April 27, 1951
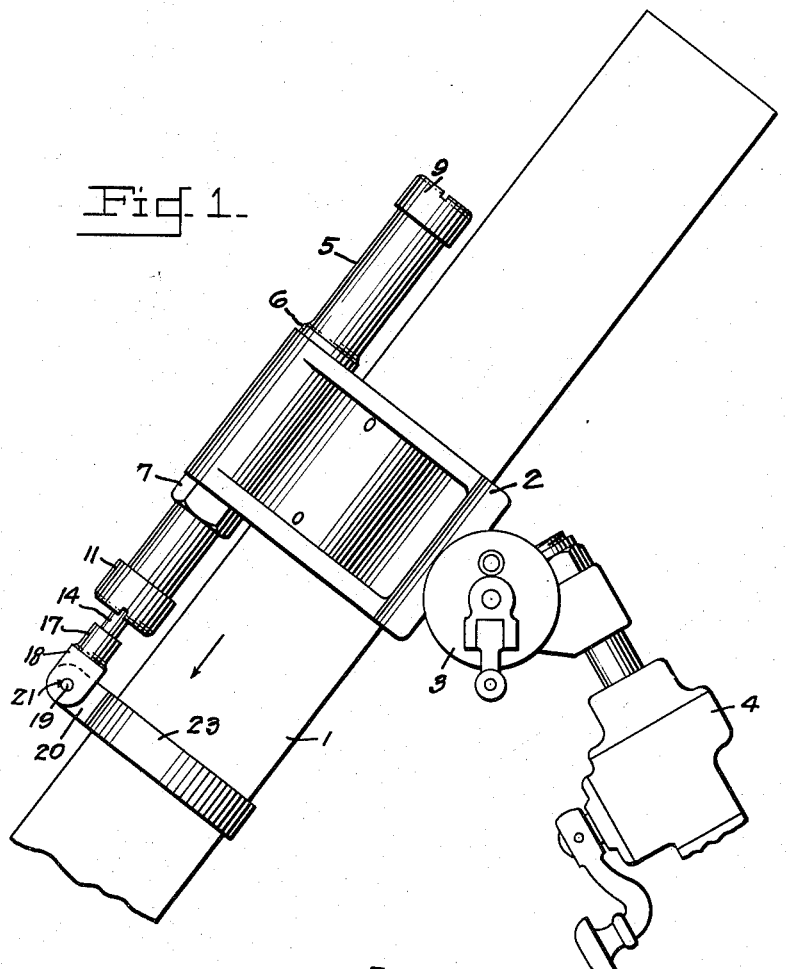
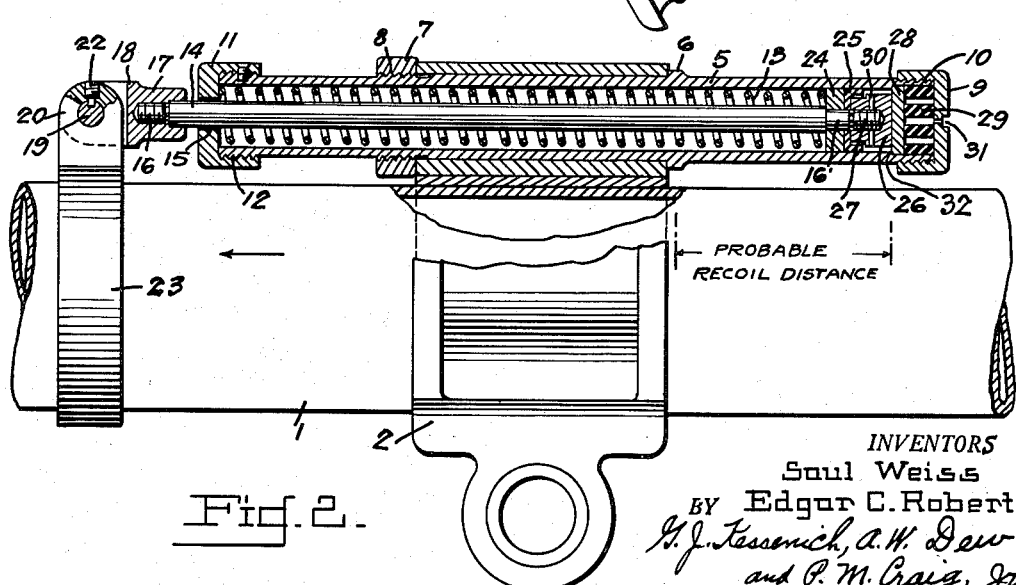
INVENTORS
Soul Weiss
Edgar C. Roberts
BY
ATTORNEYS United States Patent Office
2,732,766
Patented Jan. 31, 1956

2,732,766

MOUNT FOR MORTAR

Saul Weiss, Washington, D. C., and Edgar C. Roberts, Cherrydale, Va., assignors to the United States of America as represented by the Secretary of the Army Application April 27, 1951, Serial No. 223,425

1 Claim. (Cl. 89—44)

(Granted under Title 35, U. S. Code (1952), sec. 266)

The invention described in the specification and claims may be manufactured and used by or for the Government for governmental purposes without the payment of any royalty thereon.

The present invention relates to a novel type shock absorber for mortars.

More particularly the present invention relates to a simplified and effective mechanism to absorb and isolate or minimize the shock to the mount during firing of the mortar, and to return the mount into firing position after recoil of the mortar.

It is accordingly an object of the present invention to provide a simple, effective shock absorber for mortars.

It is another object of the present invention to provide a novel shock absorber which permits relative motion between the mortar tube and the elevating and traversing mechanisms.

It is a further object of this invention to utilize the compression of a spring to absorb the shock of the recoiling tube as effecting the mount and to restore the tube thereafter to its normal position.

It is still a further object of this invention to provide a simple mechanism to absorb the blows and shocks during the restoration of the mortar tube after compression of the spring in the shock-absorber.

Further objects and advantages will become obvious from the following description when taken in connection with the drawing, which shows for purposes of illustration only one specific embodiment of the shock-absorber; and wherein:

Fig. 1 is an elevational view of the shock absorber and its mounting over the mortar tube.

Fig. 2 is a cross-sectional view to an enlarged scale of the shock absorber and its mounting over the mortar tube.

Referring now more particularly to the drawing wherein like reference numerals are used to designate like parts in the various figures of the drawing, reference numeral 1 designates the mortar tube of which only a portion is shown. The mortar tube 1 is supported for axial sliding freely in yoke 2, which is part of the mount of the mortar, so as to permit relative axial motion between the mortar tube 1 and the yoke 2. Numerals 3 and 4 designate the traversing mechanism and the elevating mechanism respectively, which are fixedly attached to yoke 2 in any conventional manner. The particular traversing and elevating mechanisms and their respective mountings form no part of the present invention, and may follow customary practices in connection with mortars.

Yoke 2 also supports the tubular cylindrical shock absorber housing or cylinder 5 which is held in place by means of shoulder 6 and nut 7. Shoulder 6 is an integral part of housing 5 while nut 7 engages the threaded portion 8 provided on the outside surface of housing 5. The front portion of the shock absorber housing 5 is sealed off by means of cap 9 having an internal threaded portion which engages a corresponding treaded portion 10 provided on the outside of housing 5. Similarly the internal threaded portion of cap 11 engages a corresponding threaded portion 12 provided on the outside surface of the rear portion of housing 5. The hollow interior of housing 5 contains the spring 13. A shaft or rod 14 is located centrally of the spring 13, and extends rearwardly through opening 15 in cap 11. The threaded rear-end portion 16 of shaft 14 is screwed into the threaded base portion 17 of clevis 18. Tongue 20 is rigidly mounted on shaft 19 between the two fork portions of clevis 18. Screw 22 is to partially retain shaft 19 when in a disengaged position. The two fork portions are provided with aligned bores 21 in which shaft 19 is supported. Tongue 20 forms an integral part with circular collar 23 which is fastened to mortar tube 1 in any conventional manner. In one embodiment used in actual practice circular collar 23 has an internal thread which engages threads formed on the adjacent external surface of the mortar tube 1. However any other method, such as welding, may be used to fasten the collar 23 to the mortar tube 1 so as to prevent relative motion therebetween. A cotter pin (not shown) may be used to prevent relative rotation between shaft 14 and clevis 18. A piston assembly comprises a circular plate 24 having a central bore inserted over the front-end portion 16' of shaft 14, a washer 25 is mounted adjacent thereto, and a nut cap 26 having a threaded portion engages a corresponding threaded part 27 on the front-end portion 16' of shaft 14, thereby holding plate 24 and washer 25 in place between nut cap 26 and a circular shoulder formed by the reduced end portion of rod 14. Washer 25 may be made of leather or neoprene or any other suitable gasket material. A circular plate 28 rests in its normal position against shoulder 32 inside the housing 5 unless unseated therefrom by the front-end of nut cap 26, and is spaced from cap 9 by sponge rubber buffers 29. A pin 30 inserted into appropriate aligned diametrical holes in nut cap 26 and end portion 16' prevents relative rotation between shaft 14 and nut cap 26.

Yoke 2 may be made of aluminum so as to save weight. However in order to prevent excessive wear between the yoke 2, which is stationary, and the mortar tube 1 (which recoils in the direction indicated by the arrow upon firing of a round), a ring 33 of any suitable material such as brass or steel may be mounted between yoke 2 and mortar tube 1. In one embodiment of this invention, wherein the mortar tube 1 is threaded over its entire length, such ring prevented excessive wear between the threaded portion of the steel mortar tube 1 and the aluminum yoke 2. Bracket 23 and tongue 20 which are secured rigidly to mortar tube 1 move therewith in recoil.

By the construction just described, shaft or rod 14 and its attached piston assembly move relatively to cylinder 5 during recoil, thereby compressing spring 13. Air will seep around the edges of washer 25 into the space created by the lateral movement (to the left as viewed in Fig. 2) of the shaft assembly 14, 24, 25, 26 during the recoil of mortar tube 1. Upon termination of the recoil, compressed spring 13 will offer a substantially airtight seal on the return stroke (to the right as viewed in Fig. 2) of shaft assembly 14, 24, 25, 26 thereby compressing the air accumulated in the space created by the initial leftward movement of that shaft assembly and thus checking and damping the restoration of the shaft assembly, collar and mortar tube to their original position. The rate of return of the parts in counterrecoil may be controlled by providing a small hole 31 in cap 9 and by making the size of the hole 31 in accordance with the desired rate of movement in counterrecoil. In order to absorb any blow or shock during the final portion of counterrecoil, a buffer is provided in the form of plate 28 and sponge rubber 29. If the shaft and piston assembly 14, 24, 25, 26 is returned to its original position with an excess of force, it will overshoot its normal position, and the front-end of nut cap 26 will hit plate 28 tending to push the latter toward the right. However sponge rubber buffers 29 will absorb the blow or impact in a manner similar to the recoil absorption by spring 13, and the elastic characteristics of the sponge rubber buffer 29 will finally return the piston and rod assembly 14, 24, 25, 26 and the plate 28 to their normal position shown at Fig. 2.

While we have shown and described one preferred embodiment of our invention, it will be obvious to those skilled in the art that various changes and modifications may be made without departing from our invention, and we therefore aim in the appended claim to cover all such changes and modifications as fall within the scope of our invention.

We claim:

In a recoil mount for a mortar, a unitary yoke having first and second parallel laterally spaced bores therethrough of greater and lesser diameters, respectively, a mortar tube slidably fitting said first bore for guided reciprocation therein in recoil and counterrecoil, a recoil cylinder having a central portion fitting said second bore and an abutment engaging one face of said yoke, a nut threaded on said cylinder and abutting the other face of said yoke whereby said cylinder is removably secured in said yoke, in parallel with said tube, first and second caps screw threaded over the respective ends of said cylinder, a piston slidably fitting said cylinder, a rod secured at one end to said piston and passing rearwardly through a central aperture in said second cap to the exterior of said cylinder, a coil spring about said rod within said cylinder and abutting said piston and second cap at its respective ends to urge said piston into engagement with said first cap, a collar fixed about said tube rearwardly of said yoke, a pivotal connection between said collar and the contiguous end of said rod, the forward end of said cylinder having a counterbore, a circular plate slidably fitting said counterbore and normally resting on the shoulder formed thereby, and a buffer of resilient material fitting between said circular plate and said first cap whereby during final stage of counterrecoil, said piston engages and moves said plate to compress said resilient buffer material.

References Cited in the file of this patent

UNITED STATES PATENTS

| | | |
|---|---|---|
| 168,346 | Schultz | Oct. 5, 1875 |
| 659,507 | Browning | Oct. 9, 1900 |
| 1,335,290 | Myers | Mar. 30, 1920 |
| 2,046,518 | Joyce | July 7, 1936 |
| 2,213,953 | Conlon | Sept. 10, 1940 |
| 2,249,310 | Braun et al. | July 15, 1941 |
| 2,346,692 | Lucht | Apr. 18, 1944 |
| 2,433,637 | Trotter | Dec. 30, 1947 |
| 2,468,349 | Stewart | Apr. 26, 1949 |

FOREIGN PATENTS

| | | |
|---|---|---|
| 100,016 | Great Britain | Jan. 8, 1916 |
| 504,695 | France | Apr. 20, 1920 |